Figure 1:
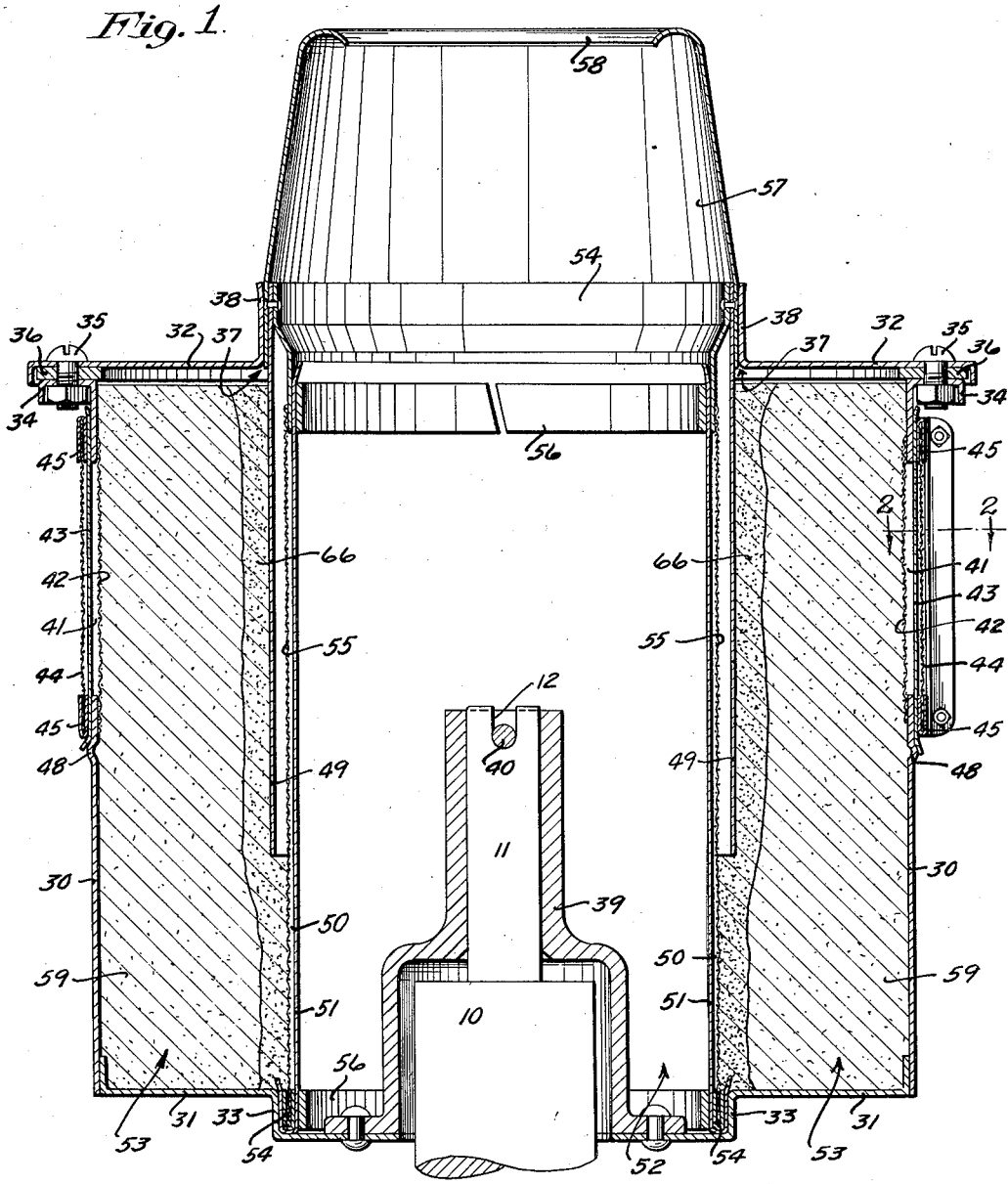

Sept. 24, 1935.  P. D. SMITH ET AL  2,015,162

CENTRIFUGAL FILTERING AND CLARIFYING APPARATUS

Filed Feb. 13, 1933

INVENTORS
PAUL D. SMITH
DAVID H. CLARY
BY THEIR ATTORNEYS

Patented Sept. 24, 1935

2,015,162

UNITED STATES PATENT OFFICE 2,015,162

CENTRIFUGAL FILTERING AND CLARIFYING APPARATUS

Paul D. Smith and David H. Clary, Minneapolis, Minn.

Application February 13, 1933, Serial No. 656,423

9 Claims. (Cl. 210—63)

Our invention relates primarily to filtering, clarifying and decolorizing fluids and has for its object to combine the processes of filteration and clarification in a centrifuge.

It is well known that in many industries, particularly where fluids are involved in the production of the finished article, it becomes necessary, at some stage of the procedure, to resort to the process of filteration and clarification of the fluid used. In the filtering process suspended solid matters are separated from the fluid and the clarifying process frees the fluid of such foreign materials or impurities actually dissolved in them in the processes in which the fluids are used. The process of clarification may also include the removal of some undesirable constituents from raw fluid materials.

While the invention is intended for general use in filtering and clarifying fluids, it is especially well adapted for use in the dry cleaning industry.

In the process of dry cleaning, the cleaning medium is generally a fluid whose properties not only remove the granules of dirt, as in an ordinary household washer, but also removes from the articles washed, grease, oil, and in some instances, some of the dyestuffs of the fabric. Water held by the fabric will generally be removed in the process of cleaning and will be held entrained in the dry cleaning fluid.

Dry cleaning fluid is expensive, and hence, must be reclaimed for further use and the present practice is to distill the fouled fluid or to clarify it by adding a solid chemical which carries down the impurities with it in settling out. This process is objectionable for the reason that it is very slow and tedious.

As previously stated, our invention accomplishes the filtering and clarifying of the fouled dry cleaning fluid by the agency of centrifugal force and is completed in a relatively short time. This invention includes a filter for the removal of suspended dirt and a bed of such material that the fluid is clarified of grease, oil and water and decolorized by the fluid being passed through the bed by centrifugal force.

The clarifying material forming the bed heretofore referred to is very fine and the filter, in addition to its filtering action, performs another important function in that it prevents the escape of material from the bed with the filtered liquid. This fine material in time fills or clogs the filter to such an extent that it is necessary to remove and clean the same or substitute a new filter therefore. One of the objects of this invention is to provide simple and efficient means for holding the filter in place so that it may be readily removed without disturbing the bed or any part of the drum assembly.

To the above end, generally stated, the invention consists of the novel devices and combinations of devices hereinafter described and defined in the claims.

In the accompanying drawing, which illustrates the invention, like characters indicate like parts throughout the several views.

Figure 2:
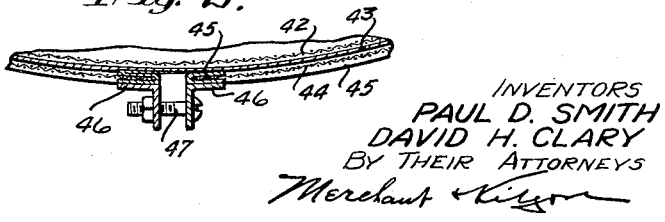

Referring to the drawing:

Fig. 1 is a view of the improved filter and clarifier in central vertical section; and Fig. 2 is a fragmentary detail view principally in section taken on the line 2—2 of Fig. 1.

The numeral 10 indicates a spindle formed centrally on the upper end of a shaft 11 and having in its upper end a transverse notch 12. In actual practice the shaft 11 will be mounted in bearings to turn about a vertical axis and driven by any suitable means at the proper speed.

Referring now in detail to the improved filter and clarifier, the same includes an upright drum assembly having a cylindrical body 30, a bottom member 31, and a cover member 32. Said bottom member 31 has a depressed central portion which forms in said member an internal annular shoulder 33. On the upper edge of the body 30 is an outturned annular flange 34 to which the cover member 32 is detachably secured by stove bolts 35. A gasket 36 is interposed between the cover member 32 and the flange 34. In the top of the cover member 32 is a central opening 37 surrounded by an upstanding annular collar 38 formed with said cover member. Within the drum assembly is a hub 39 that is axially aligned therewith and rigidly secured to the bottom member 31. This hub 39 is removably fitted to the spindle 10 and has a transverse pin 40 which loosely extends into the notch 12 and holds the filter and clarifier for rotation with the shaft 11. In the center of the bottom member 31 is an opening for the shaft 11 and the base of the hub 39 is expanded to receive the upper end portion of said shaft.

Formed in the body 30, near the top thereof, is a circumferentially extended passage 41 for the escape of filtered fluid from the filter and clarifier. The improved filter and clarifier will, of course, be mounted in a tank or other receptacle for receiving the filtered fluid. The top and bottom sections of the body 30 are connected on the inside of the drum assembly by an open mesh screen 42 that completely covers the passage 41 and forms a section of said body.

On the outside of the body 30 is a porous annular member 43 which, as shown, is a sheet of paper or other filtering material that extends completely around said body. The screen 42 is in no sense a filter but does act as a reinforcement for the bed material and serves to keep the bed material in place when the outside filter 43 is removed. To prevent the filtering member 43 from being pressed or forced outwardly during the filtering and clarifying operation, there is provided a holder 44 therefore in the form of an open mesh screen that substantially completely surrounds said filtering member. The upper and lower edge portions of the filtering member 43 overlap the edge portions of the body 30 at the passage 41.

The holder 44 is secured to the body 30 by a pair of clamping bands 45 which are U-shaped in cross-section and between the sides of which the longitudinal edge portions of said screen are secured. These two bands 45 extend substantially completely around the body 30 and the same ends thereof are connected by a pair of upright angle draw bars 46 which are adjustably connected by stove bolts 47 that are operable to contract the clamping bands 45.

By reference to Fig. 1 it will be noted that the longitudinal edge portions of the filtering member 43 are tightly clamped between the body 30 and the bands 45. An annular bead 48, pressed from the lower section of the body 30, holds the filtering member 43, the holder 44, and clamping band 45 from slipping downwardly on said body.

Extending axially into the drum through the opening 37 is a sleeve-like metallic deflector 49, the lower end of which terminates above the bottom member 31 and leaves an annular passage 50 therebetween of substantially the same width as the passage 41.

A filtering sleeve 51, preferably of the same material as the filtering member 43, extends axially through the drum, within the deflector 49 and divides said drum into an inner or fluid reception compartment 52 and into an outer or clarifying compartment 53. This filtering sleeve 51 is attached to a carrier comprising annular upper and lower members 54 and a cylindrical body member 55 in the form of an open mesh screen that connects said two members 54 and acts as a holder for the filtering sleeve 51. The body member 55 is held by the members 54 axially spaced from the deflector 49 and the upper member 54 is expanded into contact with said deflector and rigidly secured thereto. The lower member 54 is U-shaped in cross-section and the lower edge portion of the body member 55 extends between the sides thereof and is rigidly secured thereto. The lower member 54 extends into the depressed central portion of the bottom member 31 and is held centered by the shoulder 33.

Cooperating with each carrier member 54 is an internal split clamping ring 56 for holding the end portions of the filtering sleeve 51 clamped between said members and rings. By reference to Fig. 1 it will be noted that the lower end portion of the filtering sleeve 51 is folded under the lower member 54 and upwardly between said member and the shoulder 33, thereby forming a tight joint between the filtering sleeve 51 and the bottom member 31.

Secured to the deflector 49, at its upper end, is a neck 57 the lower end portion of which extends into the collar 38 with a working fit and holds the deflector 49, to which it is rigidly secured, centered therein. The neck 57 is upwardly tapered and its upper end portion is curved inwardly and downwardly to form a deflecting flange 58. The outer compartment 53 contains a medium for clarifying and decolorizing the dry cleaning fluid and the bed formed by said material is indicated by the numeral 59.

Fouled cleaning fluid to be filtered, clarified and decolorized is discharged into the compartment 52 and centrifugal force produced by the rotary movement of the device will throw said fluid through the filtering sleeve 51 and into the compartment 53 through the passage 50. Fluid passing through the filtering sleeve 51, above the lower end of the deflector 49, will strike said deflector and be directed downwardly thereby between said sleeve and the deflector 49 to the passage 50. From this passage 50 the fluid is forced upwardly through the bed 59 to the passage 41 and through the filtering material 43.

In case the fluid in the compartment 52 is forced upwardly on the walls of the neck 57 to the deflecting flange 58, said flange will direct the fluid back into the compartment 52 and thus prevent an overflow from said neck. The screen 55 holds the main body of the bed 59 out of contact with the filtering sleeve 51 and the screen 42 also holds said main body out of contact with the filtering member 43 particularly during the filling of the compartment 53 with the bed forming medium. During the filling of the compartment 53 with the medium forming the bed 59, the filtering material 43 and the filtering sleeve 51 must, of course, be in position for the reason that a certain amount of said medium will sift through the screens 42 and 55. After the device has been operating for a relatively short time the medium forming the bed 59 will pack and draw away from the screen 55 due to centrifugal force and thus permit the carrier to be removed, at will, from the drum assembly without disturbing the bed 59. The removal of the filter carrier allows old bed to be cleaned out of the drum more readily.

From the above description it is evident that all suspended solid matter in the fouled cleaning fluid will be separated therefrom as said fluid is thrown through the filtering sleeve 51 by centrifugal force. It is also evident that the filtered fluid is thrown through the bed 59 and outward of the drum through the filtering member 43. While the filtered fluid is passing through the bed 59, the same will be clarified of grease, oil and water and decolorized.

Of course, there are many industries in which the above described filter and clarifier may be used, as for instance, as a purifier for water in hotels and other buildings and for removing the odor and taste from water drawn from city mains. Chemicals used for the bed 59 may be any one of a number, granular wood charcoal, activated carbon, etc. These chemicals could be used alone; and to aid them particularly in degreasing and dehydrating fouled fluids, the above chemicals may be mixed with any one of several silicates of soda, with granular caustic, etc.

To prolong the life of the bed 59, sodium meta silicate may be mixed with the above or, as shown, introduced into the compartment 53 between the deflector 49 and holder 55, as shown in Fig. 1 and indicated by the numeral 66.

From the above description it is evident that the filtering member 43 and the filtering sleeve 51, when worn out or when filled or clogged with the bed forming medium to such an extent that their filtering capacity is materially reduced, may be readily removed from the drum assembly and a new member and sleeve substituted therefore or cleaned and replaced. It is highly important to note that the filtering member 43 and the filtering sleeve 51 may be removed from the drum assembly without disturbing the bed or removing or disturbing any of the parts of the drum assembly. To detach the filtering member 43 from the drum assembly it is only necessary to release the clamping bands 45 and the filtering sleeve 51 may be removed after the two split clamping bands 56 have been released.

It will be understood that the invention described is capable of various modifications within the scope of the invention herein disclosed and claimed.

What we claim is:

1. In a device of the class described, a rotatable drum having an inner fluid reception compartment, an outer clarifying compartment, a bed of clarifying material in the outer compartment, a porous filtering sleeve forming a partition between the two compartments, said drum having in its shell at one end thereof a passage through which fluid in the outer compartment may escape after having passed through the bed, a porous covering for the passage, and means in the outer compartment for deflecting fluid after having passed through the filtering sleeve toward the opposite end of the outer compartment from the passage.

2. In a device of the class described, a rotatable drum having an inner fluid reception compartment, an outer clarifying compartment, a bed of clarifying material in the outer compartment, said drum having in its top a central opening, a filter carrier fitted in said opening and extending axially into the drum, a porous filtering sleeve held by the carrier and forming a partition between the two compartments, said carrier having a screen-like body affording a reinforcement for the sleeve, said drum having in its shell a passage through which fluid in the outer compartment may escape after having passed through the bed, a porous covering for the passage, and a cylindrical deflector surrounding the carrier and radially spaced therefrom for directing fluid after having passed through the filtering sleeve toward one end of the outer compartment.

3. In a device of the class described, a rotatable drum having an inner fluid reception compartment, an outer clarifying compartment, a bed of clarifying material in the outer compartment, said drum having in its top a central opening and in its bottom an annular shoulder, a filter carrier comprising upper and lower annular members and a screen-like body connecting said members, the upper member being removably fitted in the opening in the top of the drum and the lower member being held centered by the shoulder, a porous filtering sleeve in the carrier and attached at its ends to the upper and lower members, a cylindrical deflector surrounding the carrier and radially spaced therefrom, said deflector being attached, at its upper end to the upper member, the lower end of the deflector being spaced above the bottom of the drum, said drum having in its shell at the top thereof a passage through which fluid in the outer compartment may escape after having passed through the bed, and a porous covering for the passage.

4. In a device of the class described, a rotatable drum assembly having an inner fluid reception compartment, an outer clarifying compartment, a bed of clarifying material in the outer compartment, said drum assembly having in its shell a passage through which fluid in the outer compartment may escape after having passed through the bed, a porous filtering material covering the passage, and fastening means detachably securing the filtering material to the drum assembly for removal therefrom without disturbing the drum assembly or the bed.

5. The structure defined in claim 4 which further includes an external guard for the filtering material held in place by the fastening means.

6. In a device of the class described, a rotatable drum assembly having an inner fluid reception compartment, an outer clarifying compartment, a bed of clarifying material in the outer compartment, a removable porous filtering sleeve forming a partition between the two compartments, said drum assembly having in its shell a passage through which fluid in the outer compartment may escape after having passed through the bed, a removable porous filtering material covering the passage, and fastening means detachably and independently securing the filtering sleeve and the filtering material relative to the drum assembly for independent removal therefrom without disturbing the drum assembly or the bed.

7. In a device of the class described, a rotatable drum assembly having an inner fluid reception compartment, an outer clarifying compartment, a bed of clarifying material in the outer compartment, said drum assembly having in its shell intermediate of its ends a passage through which fluid in the outer compartment may escape after having passed through the bed, a removable porous material covering the passage with its edge portions overlapping the shell surrounding said passage, and fastening means, including clamping bands extending around the shell, detachably securing the porous material to the shell for removal therefrom without disturbing the drum assembly or the bed.

8. In a device of the class described, a rotatable drum assembly having an inner fluid reception compartment, an outer clarifying compartment, said outer compartment having an outer screen wall and an inner screen wall, a bed of clarifying material in the outer compartment between the two screen walls, a removable porous filtering sleeve telescoped into the inner screen wall, a porous filtering material covering the outer screen wall, and fastening means detachably and independently securing the filtering sleeve and the filtering material relative to the drum assembly for independent removal therefrom without disturbing the drum assembly or the bed.

9. In a device of the class described, a rotatable drum assembly having an inner fluid reception compartment, an outer clarifying compartment, a bed of clarifying material in the outer compartment, said drum assembly having a central opening in its top, a removable filter carrier telescoped into the drum assembly through said opening, upper and lower seats in the drum assembly for the carrier and forming tight joints between said carrier and the drum assembly, said carrier being removable from the drum assembly by an axial movement without disturbing the bed, a porous filtering sleeve removably telescoped into the carrier and forming a partition between the two compartments, and fastening means detachably securing the filtering sleeve at its ends to the carrier and forming tight joints therebetween.

PAUL D. SMITH.
DAVID H. CLARY.